United States Patent
Ou-Yang

(10) Patent No.: US 6,361,844 B1
(45) Date of Patent: *Mar. 26, 2002

(54) RELEASE ARTICLE AND ADHESIVE ARTICLE COMPRISING THE RELEASE ARTICLE

(76) Inventor: David T. Ou-Yang, P.O. Box 33427, St. Paul, MN (US) 55133-3427

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,515

(22) Filed: Jan. 27, 1999

(51) Int. Cl.$^7$ .................................................. B32B 7/06
(52) U.S. Cl. .................... 428/41.5; 428/40.1; 428/41.3; 428/41.8
(58) Field of Search ................. 428/40.1, 41.5, 428/41.3, 41.8, 40.7, 40.4

(56) References Cited

U.S. PATENT DOCUMENTS

| | | | |
|---|---|---|---|
| 2,541,498 A | 2/1951 | Calvert | 206/59 |
| 3,524,759 A * | 8/1970 | McConnell et al. | 117/105.3 |
| 4,070,532 A | 1/1978 | Hammer | 526/11.2 |
| 4,124,431 A | 11/1978 | Schramer et al. | 156/309 |
| 4,151,319 A | 4/1979 | Sackoff et al. | 428/40 |
| 4,299,741 A | 11/1981 | Doehnert | 260/17.4 |
| 4,339,485 A | 7/1982 | Shibano et al. | 156/244.11 |
| 4,425,176 A | 1/1984 | Shibano et al. | 156/244.11 |
| 4,434,261 A | 2/1984 | Brugel et al. | 524/109 |
| RE32,325 E | 1/1987 | Smith | 524/229 |
| 4,698,372 A | 10/1987 | Moss | 521/145 |
| 4,731,504 A | 3/1988 | Achille et al. | 174/107 |
| 4,861,811 A * | 8/1989 | Yasuda | 523/501 |
| 4,992,486 A | 2/1991 | Feinberg | 523/210 |
| 5,178,924 A | 1/1993 | Johnson et al. | 428/40 |
| 5,209,983 A | 5/1993 | Case et al. | 428/514 |
| 5,288,548 A * | 2/1994 | Weber | 428/315.9 |
| 5,391,434 A | 2/1995 | Krutzel | 428/412 |
| 5,393,608 A | 2/1995 | Chao | 428/352 |
| 5,436,073 A | 7/1995 | Williams et al. | 428/343 |
| 5,474,820 A | 12/1995 | Murschall et al. | 428/35.7 |
| 5,516,563 A | 5/1996 | Schumann et al. | 428/34.2 |
| 5,538,804 A | 7/1996 | Ogale | 428/515 |
| 5,560,885 A | 10/1996 | Murschall et al. | 264/469 |
| 5,585,193 A | 12/1996 | Josephy et al. | 428/515 |
| 5,599,601 A * | 2/1997 | Polski et al. | 428/40.1 |
| 5,629,059 A | 5/1997 | Desai et al. | 428/34.9 |
| 5,817,386 A | 10/1998 | Adamko et al. | 428/41.3 |
| 6,015,603 A | 1/2000 | Ou-Yang | 428/195 |

FOREIGN PATENT DOCUMENTS

| | | |
|---|---|---|
| EP | 0 460 841 | 12/1991 |
| EP | 0 519 611 | 12/1992 |
| EP | 0 755 780 A1 | 1/1997 |
| EP | 0 802 046 A2 | 10/1997 |
| JP | 9143436 | 6/1997 |
| JP | 11-228920 | 8/1999 |
| WO | WO 94/16885 | 8/1994 |
| WO | WO 95/20635 | 8/1995 |
| WO | WO 95/23697 | 9/1995 |
| WO | WO 95/24449 | 9/1995 |
| WO | WO 96/05056 | 2/1996 |
| WO | WO 97/35719 | 10/1997 |
| WO | WO 98/14512 | 4/1998 |
| WO | WO 98/49604 | 11/1998 |

\* cited by examiner

Primary Examiner—Blaine Copenheaver
Assistant Examiner—Alicia Chevalier
(74) Attorney, Agent, or Firm—Colene H. Blank

(57) ABSTRACT

A release article comprising a substrate having a release material thereon, wherein the release material comprises a polymer comprising an olefin and an alkyl (meth)acrylate, wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30, and an adhesive article incorporating the release article.

23 Claims, 1 Drawing Sheet

US 6,361,844 B1

RELEASE ARTICLE AND ADHESIVE ARTICLE COMPRISING THE RELEASE ARTICLE

FIELD OF THE INVENTION

The invention relates to a release article comprising a substrate and a release material that can be used alone or as part of an adhesive article.

BACKGROUND OF THE INVENTION

Release materials are particularly useful as a casting surface for adhesives and foams as well as for coatings for paper and polymer liners for adhesive articles. One type of commercially used release materials contains silicone polymers. Silicone materials, however, have certain deficiencies. The silicone material may migrate into the adhesive resulting in a reduction in adhesive effectiveness and/or may contaminate the finished product in which the adhesive is used. This contamination can interfere with the application of coatings such as paint or cause defects upon storage or use of the final product.

There are other known release materials which do not contain silicone. Examples include release materials disclosed in U.S. Pat. Nos. 4,339,485; 4,425,176; 5,178,924; and 5,167,995.

The industry continues to seek release materials with superior peel values, i.e., low release force (i.e., low adhesion), with no adhesive transfer to the release surface and no release material transfer to the adhesive. Accordingly, an adhesive article using a release material should have consistent adhesive properties after the release material is removed. The adhesive article should also exhibit non-shocky (i.e., smooth and quiet) release upon separation of the adhesive article from the release article.

SUMMARY OF THE INVENTION

The present invention relates to a release article comprising a substrate having a release material thereon. The release material comprises a polymer comprising an olefin and an alkyl (meth)acrylate, i.e., an alkyl acrylate or an alkyl methacrylate. The term "alkyl (meth)acrylate" will be used throughout to designate either an alkyl acrylate or an alkyl methacrylate. For the purpose of the present invention, the term "polymer" in reference to a polymer comprising an olefin and an alkyl (meth)acrylate refers to copolymers or terpolymers of an olefin and an alkyl (meth)acrylate; derivatives of any of these copolymers or terpolymers; or combinations of any of these copolymers, terpolymers, or derivatives thereof. The polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

An alternative release article of the present invention comprises a substrate having opposing first and second major surfaces, wherein the first major surface has a first release material thereon and the second major surface has a second release material thereon. The first release material comprises a polymer comprising an olefin and an alkyl (meth)acrylate. The polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

In another embodiment, the present invention relates to an adhesive article. The adhesive article comprises an adhesive composition having a release material thereon. The release material comprises a polymer comprising an olefin and an alkyl (meth)acrylate. The polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

The present invention also relates to an adhesive article comprising a substrate having an adhesive composition thereon. The adhesive composition has a release material thereon. The release material comprises a polymer comprising an olefin and an alkyl (meth)acrylate. The polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

The present invention may also comprise an adhesive article comprising a substrate having an adhesive composition on one major surface and a release material on an opposing major surface. The release material comprises a polymer comprising an olefin and an alkyl (meth)acrylate. The polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

DETAILED DESCRIPTION OF THE INVENTION

Release Article

A release article in accordance with the present invention comprises a substrate having a release material thereon and can be used to form a release-coated substrate in a variety of articles, such as a low adhesion backsize (LAB) for pressure-sensitive adhesive (PSA) tapes (e.g., rolls of single-sided tape). Other articles in which the release material may be utilized include release liners, labels, wound dressings, and medical grade tapes.

The release articles of the invention exhibit good receptivity to ink, i.e., the release material can be printed or written on with overall good image quality. Also upon removal of tapes or labels from the release articles, smooth and quiet (i.e., non-shocky) release is typically observed. Shocky release is undesirable because it is not only noisy, but also frequently results in the formation of visible creases or wrinkles in the tape or label.

Figure 1:
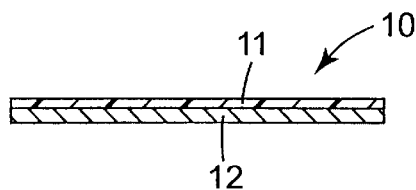
FIG. 1 is a cross-sectional view of a release article according to one embodiment of the present invention.

FIG. 1 shows a release article 10 that may be in the form of a release liner comprising a substrate 12 with a release material 11 thereon. Release material 11 is representative of the release material of the present invention and may be hot melt-coated or solvent-coated onto substrate 12. Alternatively, release material 11 and substrate 12 may be coextruded using a substrate material such as, for example, polypropylene, polyethylene or polybutylene.

Figure 2:
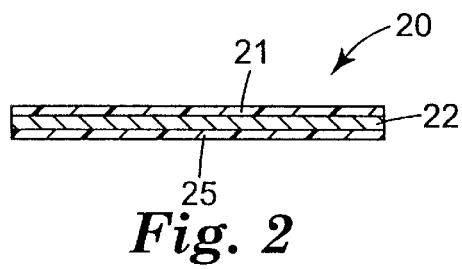
FIG. 2 is a cross-sectional view of a release article according to another embodiment of the present invention.

In a further embodiment, as shown in FIG. 2, the release article 20 may comprise a first release material 21 on substrate 22 and a second release material 25 on substrate 22 opposite the first release material. Second release material 25 may be chemically the same or different than first release material 21. At least one of first release material 21 and second release material 25 is representative of a release material of the present invention. If one of first release material 21 and second release material 25 is not representative of the release material of the present invention, that release material may comprise any known conventional release material such as polyethylene, polypropylene, fluorochemical release materials, and silicone.

The release article may be in the form of a release liner with differential release. In the embodiment depicted in FIG. 2, in order to achieve differential release, first release material 21 has a release or adhesion value that differs from that of second release material 25, even though both materials may be the same or different chemically. The release article may be prepared by hot melt coating or solvent coating the first release material 21 onto one side of substrate 22, followed by hot melt or solvent coating the second release material 25 onto the other side of substrate 22. Alternatively, all three layers may be co-extruded simultaneously to form a release article.

The thickness of the release material may be varied within a very wide range and depends on the end application. For example, the coating thickness may vary from 1 micrometer ($\mu$m) to as thick as desired, preferably 2 to 130 $\mu$m, more preferably 7 to 50 $\mu$m, most preferably 7 to 40 $\mu$m. If the release article is oriented subsequent to extrusion of the release material onto the substrate, the final thickness of the release material may be significantly reduced. The release (i.e., adhesion) value of an adhesive to the release material may vary to some degree depending on the thickness of the release material.

Release Material

The release material may comprise a polymer comprising an olefin and an alkyl (meth)acrylate.

Suitable olefins include ethylene, propylene, butylene, 2-methyl-pentene, hexene, octene, derivatives thereof, or combinations of an olefin or derivative thereof. The olefin content typically is in the range of from about 50 to about 80 weight %, preferably from about 55 to about 75 weight % and more preferably from about 60 to about 75 weight % based on the total weight of the release material. The melt temperature of the olefin is typically equal to or greater than 50° C. as measured by differential scanning calorimetry (DSC).

Preferably, the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 25 to about 50 weight % based on the total weight of the release material and the alkyl (meth)acrylate has an alkyl group with a carbon number from 1 to 30.

In either case, the alkyl group of the alkyl (meth)acrylate preferably has a carbon number ranging from 4 to 30, more preferably 4 to 20. In addition, in either case, preferably, the alkyl (meth)acrylate content of the polymer ranges from 25 to 45 weight %, more preferably 25 to 40 weight %.

Particularly preferred alkyl (meth)acrylates include n-butyl acrylates and 2-ethylhexyl acrylates. Particularly preferred polymers include ethylene n-butyl acrylate copolymers and ethylene 2-ethylhexyl acrylate copolymers. Exemplary ethylene n-butyl acrylate copolymers are commercially available from Elf Atochem, Philadelphia, Pa., under the trade designation "Lotryl 28BA175", "Lotryl 30BA02", "Lotryl 35BA40", "Lotryl 37BA06", and "Lotryl 40BA200". Exemplary ethylene 2-ethylhexyl acrylate copolymer is manufactured by Elf Atochem under the designation number "27 2EH120". Examples of suitable derivatives of ethylene alkyl acrylate copolymers include an acid modified ethylene methyl acrylate, for example, commercially available from duPont under the trade designation "Bynel CXA E214".

Preferably, the polymer has a melt index or melt flow rate, as measured by ASTM D 1238, greater than or equal to about 1 gram/10 minutes (g/10 min), more preferably 1 to 400 g/10 min, most preferably 1 to 60 g/10 min. Preferably, the polymer has a density, as measured by ASTM D792-9, of greater than or equal to about 0.90 g/cm$^3$, preferably 0.91 to 0.96 g/cm$^3$, more preferably 0.91 to 0.94 g/cm$^3$.

The release material may also contain additives. Exemplary additives include ultraviolet light absorbers, ultraviolet light inhibitors, antioxidants, colorants, fluorescent agents, tracers, anti-caking agents, and fillers. Exemplary ultraviolet light absorbers include those available from Ciba-Geigy Corporation, New York City, N.Y. under the trade designation "Tinuvin 325" and "Tinuvin 900" and those available from Clariant Corporation, Charlotte, N.C. under the trade designation "Sandover VSU". Exemplary ultraviolet light inhibitors include those available from Ciba-Geigy under the trade designation "Tinuvin 292" and "Tinuvin 144". Exemplary antioxidants include those available from R. T. Vanderbilt Company, Inc., Norwalk, Conn. under the trade designation "Vanox 1320" and "Vanox ODP". Exemplary colorants (i.e., pigments and dyes) include titanium dioxide available from E.I. duPont de Nemours & Company, Wilmington, Del. ("duPont") under the trade designation "Ti-Pure R-104". Exemplary fluorescent agents include those available from Ciba-Geigy under the trade designation "Uvitex OB". Exemplary anti-caking agents include silica available from Degussa Corporation, Teterboro, N.J. under the trade designation "Siperant 22" and "Siperant D17". Exemplary fillers include calcium carbonate, for example, available from Georgia Marble Company, Altanta, Ga. under the trade designation "Gamaco" and "Calwhite", clay, for example, available from Huber Industrial Minerals, Macon, Ga. under the trade designation "Huber 40C" and "Huber 900", and talc such as that available from Pfizer Minerals, Pigments and Metals Division, New York City, N.Y. under the trade designation "Pfizer CP 38-33".

The release material may further comprise an additional component such as a homopolymer, a copolymer, a terpolymer, or derivatives thereof, or combinations of a homopolymer, copolymer, terpolymer, or derivatives thereof, of an olefin or ethylene vinyl acetate.

Exemplary olefin-based additional components include polyethylene, polypropylene, and polybutylene, such as high density polyethylene (HDPE), for example, commercially available from Dow Chemical Company, Midland, Mich. ("Dow") under the trade designation "4352N", low density polyethylene (LDPE), for example, commercially available from Dow under the trade designation "LDPE 722" (having a melt index of 8.0 g/10 min. and a density of 0.92 g/cm$^3$); linear low density polyethylene (LLDPE), for example, commercially available from Dow under the trade designation "Dowlex 2244" (having a melt index of 3.3 g/10 min. and a density of 0.92 g/cm$^3$); polypropylene, for example, commercially available from Shell Chemical Company, Houston, Tex. ("Shell") under the trade designation "SRD-4-188 (having a melt flow rate of 5.0 g/10 min and a butylene content of 5%); and polybutylene, for example, commercially available from Shell under the trade designation "PB DP-8220".

Other exemplary olefin-based additional components include copolymers of an olefin such as a copolymer of ethylene and any of propylene, butylene, hexene, or octene; or a copolymer of propylene and any of ethylene, butylene, hexene, or octene; or terpolymers of an olefin such as a terpolymer of ethylene, butylene, and hexene. A terpolymer of ethylene, butylene, and hexene is commercially available from Exxon Chemical Company, Houston, Tex., under the trade designation "Exact 3034" (having a melt index of 3.5 g/10 min. and a density of 0.902 g/cm$^3$).

Exemplary ethylene vinyl acetate-based additional components include an ethylene vinyl acetate copolymer, for example, commercially available from duPont under the trade designation "Elvax 260" or a modified ethylene vinyl acetate copolymer, for example, commercially available from du Pont under the trade designation "Bynel 3101".

Substrate for Release Material

The release material of the present invention can be generally used as a release coating for a substrate, which may be, for example, a sheet, a fiber, or a shaped object. One preferred type of substrate is that which is used for adhesive-coated articles (e.g., pressure-sensitive adhesive-coated articles), such as tapes, labels, bandages, and the like. The composition may be applied to at least a portion of at least one major surface (typically the entire surface) of suitable flexible or inflexible substrate materials.

Useful flexible substrate materials include paper; a polymer, for example, in the form of a plastic film, such as polyethylene, propylene, polybutylene, polyamide, polyvinylchloride, polycarbonate, polytetrafluoroethylene, polyester (e.g., polyethylene terephthalate), cellulose acetate; woven materials, for example, woven fabric formed of threads of synthetic fibers or natural materials such as cotton or blends of these; nonwoven materials such as nonwoven fabric, for example, air-laid webs of synthetic or natural fibers or blends of these; and the like. Useful inflexible substrate materials, which may be in the form of foils or sheets, include metals such as aluminum and stainless steel, glass, and ceramic materials. Primers known in the art can be utilized to aid in the adhesion of the release coating to the substrate.

When preparing articles containing release-coated substrates, such as tapes, the substrate may be selected from a wide variety of materials to achieve a support layer for the release material. For example, when the release material is co-extruded with the substrate, the substrate typically comprises a hot melt processable polymer, such as a thermoplastic polymer. Representative examples of these materials include polyamides (e.g., nylon); polyolefins (e.g., polyethylene, polypropylene, polybutylene, poly-4-methylpentene and others); polystyrene; polyester; copolyester; polyvinyl chloride; polyethylene vinyl acetate; copolymers (e.g., ethylene propylene copolymer, ethylene butylene copolymer, ethylene hexene copolymer, ethylene octene copolymer, propylene butylene copolymer, and thermoplastic rubber block copolymers); polymethyl methacrylate; and mixtures and copolymers thereof. Especially preferred materials for a substrate include polypropylene, polypropylene blended with other polyolefins, and copolymers of propylene and other alpha-olefins in amounts, for example, of up to about 50% by weight based on total weight of the substrate. Preferred materials for a substrate include semi-crystalline polypropylene having a melting point greater than about 150° C., semi-crystalline polyethylene having a melting point greater than about 100° C., and semi-crystalline or amorphous polyester. Many of the aforementioned polymeric materials are commercially available and may be used without modification. Alternatively, they may be modified in ways well known to one of ordinary skill in the art. For example, the compositions for preparing substrates can be modified with minor amounts of conventional modifiers, for example, colorants (i.e., pigments, dyes), fluorescing agents, antioxidants, and fillers, such as zinc oxide, titanium dioxide, calcium carbonate, hydrocarbon resins, and the like.

When the release material is extrusion-coated onto a pre-existing substrate, the substrate may be selected from the list of thermoplastic materials identified above. Additionally, it may be selected from non-thermoplastic polymers, metals, cloth, non-woven webs (polymeric and non-polymeric), polymeric foam, ceramic, paper, and the like.

When the release material is co-extruded with the substrate or is extrusion-coated onto a substrate made from a polymer, it is also preferred for some applications that the substrate be orientable in at least one direction before or after extrusion of the release coating to form a release-coated oriented substrate or an oriented release-coated substrate. As such, orientable substrates selected from the aforementioned polymeric materials are especially preferred substrates for forming release articles of the present invention. The term "oriented" herein refers to strengthening the polymer by stretching at a temperature below its crystalline melting point. For example, suitable polypropylene substrates can be cast extruded polypropylene films, monoaxially oriented polypropylene (MOPP), sequentially biaxially oriented polypropylene (BOPP), or simultaneously biaxially oriented polypropylene (SBOPP). Suitable polyethylene substrates can be, for example, cast extruded high density polyethylene, medium density polyethylene, low density polyethylene, linear low density polyethylene, monoaxially oriented polyethylene, or biaxially oriented polyethylene.

Hot melt processable tie layers can be used to improve interlayer adhesion between co-extruded release materials and substrates. Examples of suitable tie layers include polyethylene, for example, commercially available from Dow under the trade designations "Dowlex 2244" and "LDPE 722", ethylene vinyl acetate such as that available from duPont under the trade designations "Elvax 250" and "Elvax 4260", modified ethylene vinyl acetate copolymers (e.g., Bynel CXA 1123), commercially available from duPont, maleated polypropylenes, ethylene acrylic acid copolymers, and other materials.

Method of Making a Release Article

Preferably, the release material is hot melt coated on a substrate using an extruder. In this manner, the release material can be directly coated subsequent to its "in-situ" preparation from the same piece of processing equipment. However, the release materials may alternatively be coated out of, for example, a suitable organic solvent (e.g., organic solvents in which the release material is soluble), although the release properties may differ from those of release coatings that are formed via hot melt processing. If coated out of solvent, the desired concentration of the release material in a release coating composition made therefrom depends upon the method of coating and upon the desired final coating thickness. Typically, the release coating composition is coated at about 1% to about 15% solids.

If coating out of solvent, a release coating composition may be applied to a suitable substrate by means of conventional coating techniques, such as wire-wound rod, direct gravure, offset gravure, reverse roll, air-knife, and trailing blade coating. The coating can be dried at room temperature, at an elevated temperature, or a combination thereof, provided that the substrate material can withstand the elevated temperature. Typically, the elevated temperature is about 60° C. to about 130° C. The resulting release coating provides an effective release as, for example, a low adhesion backsize, for a wide variety of conventional pressure-sensitive adhesives, such as natural rubber-based, acrylic, tackified block copolymer, poly(alpha)olefin, silicone, and other synthetic film-forming, elastomeric materials.

The release material may be blended with one or more additional components as described above, when forming a release coating composition. Any suitable method can be used for preparing such blends. For example, blending may be performed by any method that results in a substantially homogenous distribution of the additional components in the release material. For example, the polymer and any additional components of the release material can be melt blended using a twin screw extruder before extrusion coating or in situ, or the pellets of the resins may be dry blended just prior to extrusion coating or in situ. Alternatively, blending can be performed by solvent blending or any other suitable physical means.

Adhesive Article

Figure 3:
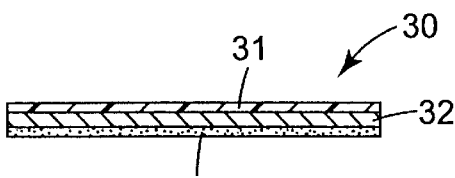
FIG. 3 is a cross-sectional view of an adhesive article according to one embodiment of the present invention.

The release material may be used in conjunction with an adhesive article. The adhesive article may comprise an adhesive composition having a release material thereon. Single-sided tapes can be prepared which include a substrate having an adhesive layer adhered to one side thereof and a release coating on the other side thereof. Tapes can be used in a wide variety of applications such as to adhere two surfaces together (e.g., flaps of packing material) or in the medical area (e.g., wound dressings). The adhesive article may further comprise a substrate in the form of a backing and the release material may be present on the side of the substrate opposite the adhesive composition as depicted in FIG. 3. FIG. 3 shows an adhesive article 30 that may be in the form of a tape with the release material 31 acting as a low adhesion backsize (LAB) with the substrate 32 typically referred to as a backing. The tape may be formed by hot melt or solvent coating release material 31 on one side of substrate 32, followed by hot melt or solvent coating adhesive 33 on the other side of substrate 32. Alternatively, all three layers may be co-extruded simultaneously. The tape may be in roll form or pad form.

Figure 4:
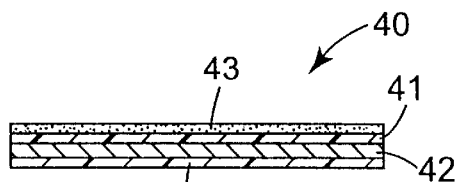
FIG. 4 is a cross-sectional view of an adhesive article according to another embodiment of the present invention.

In an adhesive article 40 as shown in FIG. 4, the release material may be present on the adhesive composition. FIG. 4 depicts an adhesive article comprising a release article in the form of a differential release liner. The release article is similar to the release article shown in FIG. 2 with first release material 41, representative of the release material of the present invention, coated on one side of substrate 42 and second release material 45 coated on the other side of substrate 42. Second release material 45 may be chemically the same or different than first release material 41. As described with respect to FIG. 2, at least one of first release material 41 and second release material 45 is representative of a release material of the present invention. If one of first release material 41 and second release material 45 is not representative of the release material of the present invention, that release material may comprise any known conventional release material such as polyethylene, polypropylene, fluorochemical release materials, and silicone.

The adhesive article 40 preferable has differential release. In the embodiment depicted in FIG. 4, in order to achieve differential release, first release material 41 has a release or adhesion value that differs from that of second release material 45, even though both materials may be the same or different chemically. Preferably, first release material 41, next to adhesive 43, has a higher adhesion/release value than second release material 45. Adhesive 43 may be in the form of an adhesive film or foam.

Figure 5:
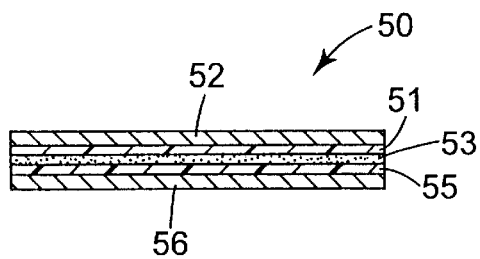
FIG. 5 is a cross-sectional view of an adhesive article according to yet another embodiment of the present invention.

FIG. 5 represents adhesive article 50 comprising a lamination adhesive with two release liners adhered to the lamination adhesive. Each of the release liners has different release properties. A release article comprising first substrate 52 with first release material 51, representative of the present invention, is laminated to one side of adhesive 53 and second substrate 56 with second release material 55 is laminated to the other side of adhesive 53. Second release material 55 may be chemically the same or different than first release material 51. As described with respect to FIG. 2, at least one of first release material 51 and second release material 55 is representative of a release material of the present invention. If one of first release material 51 and second release material 55 is not representative of the release material of the present invention, that release material may comprise any known conventional release material such as polyethylene, polypropylene, fluorochemical release materials, and silicone.

The adhesive article 50 preferable has differential release. In the embodiment shown in FIG. 5, in order to achieve differential release, first release material 51 has a release or adhesion value that differs from that of second release material 55, even though both materials may be the same or different chemically. Preferably, first release material 51, next to adhesive 53, has a higher adhesion/release value than second release material 55. In use, typically the release material 55 with its substrate 56, acting as a release liner, is removed and the adhesive is applied to an object. Then release material 51 wit i its substrate 52, acting as a release liner, is removed and another object is applied to the exposed adhesive.

Figure 6:
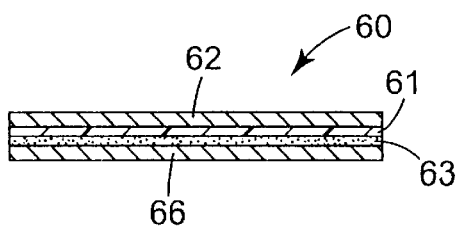
FIG. 6 is a cross-sectional view of an adhesive article according to still another embodiment of the present invention.

FIG. 6 shows an adhesive article 60 that may be in the form of a tape or a label with a release material thereon acting as a release liner. A release material 61 and first substrate 62, which can act as a release liner, are adhered to the adhesive article which comprises adhesive 63 on second substrate 66. The adhesive article is generally formed by coating adhesive 63 on second substrate 66 and then laminating adhesive 63 to the release material 61 on first substrate 62. When the adhesive article of FIG. 6 is a label, adhesive 63 and second substrate 66 typically are referred to as facestock. Labels are formed by die cutting through adhesive 63 of the facestock and to release material 61 of the release liner.

The release material used in conjunction with an adhesive article may have substrate thereon as described above, which may be the same or different from the substrate bearing the adhesive composition.

Adhesion or release values, as referenced above, refer to the adhesion or release between a release material and an adhesive. For the purpose of the present invention, preferred adhesion or release values, as measured using test method C of ASTM D 3330-90, entitled "Peel Adhesion of Pressure-Sensitive Tape at 180° Angle", at a peel speed of 228.6 cm/min and described in detail below with reference to Examples 1 to 11 and Comparative Examples 1 to 13, range from greater than zero to about 200 g/2.5 cm, preferably 5 to 150 g/2.5 cm, more preferably 5 to 100 g/2.5 cm, most preferably 5 to 70 g/2.5 cm.

When preparing an adhesive article including the release material of the present invention, any suitable adhesive composition can be used. Adhesives useful in the preparation of articles containing the release material of the present invention include hot melt-coated formulations, transfer-coated formulations, solvent-coated formulations, and latex formulations, as well as laminating, thermally-activated, and water-activated adhesives. Examples of preferred adhesives include acrylate-based adhesives and fluorochemical adhesives. Additionally, the adhesives can contain additives such as plasticizers, fillers, antioxidants, stabilizers, pigments, diffusing particles, tackifying resins, hydrocarbon oils, curatives, and solvents.

Preferred adhesives of the present invention can comprise pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

The adhesive composition of the adhesive article preferably has a polar content of about zero to about 25%, preferably 0 to 20%, more preferably 0 to 15%, most preferably 2 to 10%, based on the weight of the adhesive.

Adhesive compositions used in the present invention can be extrudable and can be co-extruded with the release material and a substrate material when forming tapes, for example. They may be crosslinked, if desired, after application. While it is preferred that the adhesive be applied by extrusion techniques, however, the adhesive may be applied by a variety of other techniques.

Suitable substrates for the adhesive article may be the same or different from those used for the release article and may include, for example, polyethylene, polypropylene, nylon, polycarbonate, polyvinylchloride, polyester, as well as woven or non-woven webs.

This invention is illustrated by the following examples, but the particular materials and amounts thereof recited in these examples, as well as other conditions and details should not be construed to unduly limit this invention. All percentages and ratios in the examples and elsewhere throughout are by weight unless indicated otherwise. All example numbers having a "C-" preceding the number are comparative examples; all example numbers having a "E-" preceding the number are representative of the present invention.

EXAMPLES

Resins for Release Material

Resins A through M and O through X in Table I were obtained as pellets from the vendor. Resin N was obtained by melt blending pellets of Resin P and Resin M in a 40:60 weight percent ratio. Resins A through R are copolymers of ethylene and an alkyl acrylate. Resins A to E, H to J, L, M, O to Q, and V to W, as well as the components of N are commercially available from Elf Atochem, North America, Inc., Philadelphia, Pa. Resins F and G are commercially available from Union Carbide Corp., Danbury, Conn. Resin K is commercially available from Chevron Chemical Company, Orange, Tex. Resins S and T are commercially available from Dow Chemical Company, Midland, Mich. Resin U is commercially available from Exxon Chemical Company, Houston, Tex. Resin X is commercially available from Shell Chemical Company, Houston, Tex. Resin R is manufactured by Elf Atochem. The trade designation of the resins is indicated in Table I.

The melt index (MI) values in Table I were obtained from the respective vendor's trade literature and measured in g/10 min according to ASTM D 1238. The density in Table I was measured in g/cm$^3$ according to ASTM D 792-9.

TABLE I

| Resin | Trade Designation | Composition of the Resin | Alkyl Acrylate Type: Content (Weight %) | MI | Density |
|---|---|---|---|---|---|
| A | Lotryl 9MA02 | copolymer of ethylene and methyl acrylate | Methyl: 9.5 | 2.2 | 0.928 |
| B | Lotryl 15MA03 | copolymer of ethylene and methyl acrylate | Methyl: 14.5 | 2.8 | — |
| C | Lotryl 20MA08 | copolymer of ethylene and methyl acrylate | Methyl: 20.5 | 8 | — |
| D | Lotryl 28MA07 | copolymer of ethylene and methyl acrylate | Methyl: 28 | 7 | — |
| E | Lotryl 35MA05 | copolymer of ethylene and methyl acrylate | Methyl: 35 | 5 | 0.959 |
| F | DPDA6182 | copolymer of ethylene and ethyl acrylate | Ethyl: 15 | 15 | — |
| G | DPD6169 | copolymer of ethylene and ethyl acrylate | Ethyl: 18 | 6 | — |
| H | Lotader 4720 | terpolymer of ethylene, 30% ethyl acrylate, and 0.8% maleic anhydride | Ethyl: 30 | 30 | — |
| I | Lotryl 7BA01 | copolymer of ethylene and n-butyl acrylate | n-Butyl: 7 | 1.4 | 0.918 |
| J | Lotryl 17BA04 | copolymer of ethylene and n-butyl acrylate | n-Butyl: 17.5 | 4.0 | 0.925 |
| K | DS3054-70 | copolymer of ethylene and n-butyl acrylate | n-Butyl: 20.0 | 6.0 | — |
| L | Lotryl 28BA175 | copolymer of ethylene and n-butyl acrylate | n-Butyl: 28 | 175.0 | — |
| M | Lotryl 30BA02 | copolymer of ethylene and n-butyl acrylate | n-Butyl: 30 | 2 | 0.928 |
| N | 40% Lotryl 37BA06/ 60% Lotryl 30BA02 | copolymer of ethylene and n-butyl acrylate | n-Butyl: 32.8 | 3.6 | — |
| O | Lotryl 35BA40 | copolymer of ethylene and n-butyl acrylate | n-Butyl: 35 | 40 | 0.925 |
| P | Lotryl 37BA06 | copolymer of ethylene and n-butyl acrylate | n-Butyl: 37 | 6.0 | — |

TABLE I-continued

| Resin | Trade Designation | Composition of the Resin | Alkyl Acrylate Type: Content (Weight %) | MI | Density |
|---|---|---|---|---|---|
| Q | Lotryl 40BA200 | copolymer of ethylene and n-butyl acrylate | n-Butyl: 40 | 200 | — |
| R | 27 2EH120 | copolymer of ethylene and 2-ethylhexyl acrylate | 2-Ethylhexyl: 27 | 120 | — |
| S | LDPE 5351 | low density polyethylene | None: 0 | 1.9 | 0.926 |
| T | HDPE 4352N | high density polyethylene | None: 0 | 4 | 0.952 |
| U | Exact 3027 | ethylene-butene copolymer containing 14% butene | None: 0 | 3.5 | 0.900 |
| V | Evatane 33-25 | polyethylene vinyl acetate, 33% vinyl acetate content | None: 0 | ^ | — |
| W | Evatane 40-55 | polyethylene vinyl acetate, 40% vinyl acetate content | None: 0 | ^ | — |
| X | PB DP-8220 | Polybutylene | None: 0 | 2.0 | 0.897 |

—=Resin was not tested for density
^=Melt index value was not available from vendor

Examples 1 to 11 and Comparative Examples 1 to 13

Adhesive articles, identified as Examples 1 to 11 and Comparative Examples 1 to 13 in Table II, were prepared using release articles which were prepared from Resins A through X, as indicated in Table II, as release materials. The substrate was a two layer film composite consisting of a 7.6 micron thick layer of polyethylene vinyl acetate (EVA) and a 14.2 micron thick layer of polyester, commercially available under the trade designation "SCOTCHPAK 135" from Minnesota Mining and Manufacturing Company (3M), St. Paul, Minn. Each release article was prepared by independently extruding a 38 micron thick layer of Resins A through X as indicated in Table I onto the EVA side of the "SCOTCHPAK 135" film. For Examples E-2, E-5, and E-7, the extruder used was a Haake Rheocord, commercially available from Haake Inc., Saddle Brooke, N.J. and the extrusion temperature profile was: zone 1=60° C.; zone 2=99° C.; zone 3=138° C.; and die temperature=138° C. For all other Examples and Comparative Examples in Table II, the extruder used was a Haake Rheocord, commercially available from Haake Inc., Saddle Brooke, N.J. and the extrusion temperature profile was: zone 1=60° C.; zone 2=118° C.; zone 3=177° C.; and die temperature=177° C.

Eight tape samples, four having the trade designation "Scotch brand No. 850 Silver Polyester Film Tape" ("Tape #850") and four having the trade designation "3M 8439 Very Low Outgassing High Shear Polyester Tape" ("Tape #8439"), all available from 3M, were laminated onto the release material of each prepared release article to form an adhesive article. Each of the tape samples was 2.54 cm wide and 25.4 cm long and was laminated to the release article by placing the tape sample on the release article and then laminating the tape sample to the release article at a pressure of 1.8 kg/cm using a W. G. Laminator (Serial Number MDS001049WG; from Warman International, Inc., Madison, Wis.). Each resultant adhesive article containing the eight tape samples was aged at 70° C. and 90% relative humidity (RH) for 3 days, at which time each adhesive article containing the tape samples was removed from the heated relative humidity chamber and maintained at room temperature and 50% RH for 2 hours. Each tape sample was then removed from the release article using test method C of ASTM D 3330-90 (entitled "Peel Adhesion of Pressure-Sensitive Tape at 180° Angle") at a peel speed of 228.6 cm/min. The results for each adhesive article are set forth in Table II and are the average of four tests for each of Tape #850 and Tape #8439.

Each adhesive article was also evaluated for shockiness by audibly and visually (with the unaided eye) observing the tape as it was removed from the release article with the observer being about 25–30 cm from the sample. The adhesive article was rated as "Yes" for shockiness when removal of the tape sample was either noisy (i.e., raspy) or resulted in visible wrinkles in the tape during removal of the tape from the adhesive article or both. The adhesive article was rated as "No" for shockiness when removal of the tape sample was both quiet (i.e., smooth) and no wrinkles were visibly observed in the tape during removal of the tape from the release article. The results are set forth in Table II.

The data in Table II shows that adhesive article examples representative of the present invention have superior adhesion values (i.e., low adhesion values and exhibit non-shocky release) in conjunction with at least one tape construction.

Table II

| Adhesive Article No. | Composition of Release Material (Resin from Table I) | Adhesion Results w/Tape #850 | | Adhesion Results w/Tape #8439 | |
|---|---|---|---|---|---|
| | | Value (g/2.5 cm) | Shocky | Value (g/2.5 cm) | Shocky |
| E-1 | K | 143.4 | No | 223.6 | No |
| E-2 | L | 37.4 | No | 198.1 | No |
| E-3 | M | 31.8 | No | 140.5 | No |
| E-4 | N | 48.0 | No | 51.3 | No |
| E-5 | O | 38.1 | No | 24.4 | No |
| E-6 | P | 39.8 | No | 38.2 | No |
| E-7 | Q | 178.2* | No | 39.0 | No |
| E-8 | R | — | No | 24.8 | No |
| E-9 | D | 237.7 | No | 189.6 | No |
| E-10 | E | 350.9 | No | 113.9 | No |
| E-11 | H | 401.9 | No | 79.2 | No |
| C-1 | A | 220.7 | No | 311.3 | No |
| C-2 | B | 410.4 | No | 483.9 | No |
| C-3 | C | 458.5 | No | 467.0 | No |
| C-4 | F | 656.6 | No | 503.7 | No |
| C-5 | G | 357.5 | Yes | 571.7 | No |
| C-6 | I | 263.2 | No | 410.4 | No |
| C-7 | J | 200.9 | No | 300.0 | No |
| C-8 | S | 130.8 | Yes | 373.6 | Yes |
| C-9 | T | 301.4 | Yes | 510.9 | Yes |
| C-10 | U | 88.3 | Yes | 232.1 | Yes |
| C-11 | V | 367.9 | No | 167.0 | No |
| C-12 | W | 894.3 | No | 146.2 | No |
| C-13 | X | 93.4 | Yes | 280.2 | Yes |

*=Sample may have been contaminated.
—=Sample was not tested.

Examples 12 to 17 and Comparative Examples 14 to 15

Resin P in Table I in pellet form was independently melt blended in various weight ratios with either Resin T or Resin X in Table I. The resultant blended resins were independently extruded as a 38 micron thick layer onto "SCOTCH-PAK 135 film" substrate as described in Examples 1 to 11 and Comparative Examples 1 to 13. The extruder was a Haake Rheocord, commercially available from Haake Inc., Saddle Brooke, N.J. and the extrusion temperature profile was: zone 1=60° C.; zone 2=118° C.; zone 3=177° C.; die temperature=177° C. Tape samples of Tape #850 and Tape #8439 were laminated to the release material of each prepared release article, aged and evaluated as described in Examples 1 to 11 and Comparative Examples 1 to 13. The results for each adhesive article are set out in Table III and represent the average of four tape tests for each of Tape #850 and Tape #8439.

The data in Table III show the relatively high adhesion values as well as shocky release of release articles of high density polyethylene and polybutylene (Comparative Examples C-14 and C-15). However, when the high density polyethylene and polybutylene were independently blended with a copolymer of ethylene and n-butyl acrylate of the present invention (Resin P from Table I), a decrease in adhesion values and smooth release were observed.

TABLE III

| Adhesive Article No. | Composition of Release Material (Resin from Table I; Weight Ratio) | Alkyl Acrylate Content of Polyethylene n-Butyl Acrylate (Weight %) | Adhesion Results w/Tape #850 Value (g/2.5 cm) | Shocky | Adhesion Results w/Tape #8439 Value (g/2.5 cm) | Shocky |
|---|---|---|---|---|---|---|
| E-12 | P:T; 35:65 | 37 | 88.6 | No | 534.9 | No |
| E-13 | P:T; 50:50 | 37 | 50.2 | No | 249.0 | No |
| E-14 | P:T; 65:35 | 37 | 48.8 | No | 57.1 | No |
| E-15 | P:T; 80:20 | 37 | 51.3 | No | 65.2 | No |
| E-16 | P:X; 65:35 | 37 | 67.6 | No | 246.2 | No |
| E-17 | P:X; 80:20 | 37 | 54.4 | No | 135.0 | No |
| C-14 | T | 0 | 301.4 | Yes | 510.0 | Yes |
| C-15 | X | 0 | 93.4 | Yes | 280.2 | Yes |

What is claimed is:

1. A release article comprising a substrate having a release material thereon, wherein the release material comprises a polymer comprising an olefin and an alkyl (meth)acrylate, wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 28 to about 50 weight % based on the total weight of the release material and the alkyl (meth)acrylate has an alkyl group with a carbon number from 1 to 30.

2. The release article of claim 1 wherein the release material further comprises an additional component comprising a homopolymer, copolymer, terpolymer, or derivatives thereof, or combinations thereof, of an olefin or an ethylene vinyl acetate.

3. The release article of claim 2 wherein the additional component comprises a copolymer of ethylene and any of propylene, butylene, hexene, or octene; or a copolymer of propylene and any of ethylene, butylene, hexene, or octene; or a terpolymer of ethylene, butylene, and hexene.

4. The release article of claim 1 wherein the alkyl group of the alkyl (meth)acrylate of the polymer has a carbon number ranging from 4 to 30.

5. The release article of claim 1 wherein the alkyl group of the alkyl (meth)acrylate of the polymer has a carbon number ranging from 4 to 20.

6. The release article of claim 1 wherein the alkyl (meth)acrylate content of the polymer ranges from 25 to 45 weight % based on the total weight of the release material.

7. The release article of claim 1 wherein the alkyl (meth)acrylate content of the polymer ranges from 25 to 40 weight % based on the total weight of the release material.

8. The release article of claim 1 wherein the polymer has a melt index of greater than or equal to about 1 g/10 min.

9. The release article of claim 1 wherein the polymer has a melt index ranging from 1 to 400 g/10 min.

10. The release article of claim 1 wherein the polymer has a melt index ranging from 1 to 60 g/10 min.

11. The release article of claim 1 wherein the polymer has a density of greater than or equal to about 0.90 g/cm$^3$.

12. The release article of claim 1 wherein the polymer has a density ranging from 0.91 to 0.96 g/cm$^3$.

13. The release article of claim 1 wherein the polymer has a density ranging from 0.91 to 0.94 g/cm$^3$.

14. The release article of claim 1 wherein the olefin comprises ethylene, propylene, butylene, 2-methyl-pentene, hexene, octene, derivatives thereof, or combinations thereof.

15. The release article of claim 1 wherein the substrate comprises paper, a polymer, woven material, nonwoven material, metal, glass, or ceramic materials.

16. The release article of claim 15 wherein the polymer comprises polyethylene, polypropylene, polybutylene, polyamide, polyvinylchloride, polycarbonate, polytetrafluoroethylene, polyester, or cellulose acetate.

17. An adhesive article comprising an adhesive composition having a release material thereon, wherein the release material comprises a polymer comprising an olefin and an alkyl (meth)acrylate,
wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 28 to about 50 weight % based on the total weight of the release material and the alkyl (meth)acrylate has an alkyl group with a carbon number from 1 to 30.

18. The adhesive article of claim 17 wherein the adhesive composition has a polar content ranging from about zero to about 25% based on the weight of the adhesive composition.

19. The adhesive article of claim 17 wherein the adhesive composition comprises an acrylate-based adhesive or a fluorochemical adhesive.

20. The adhesive article of claim 17 wherein the adhesive composition comprises a pressure sensitive adhesive.

21. A release article comprising a substrate having opposing first and second major surfaces, wherein the first major surface has a first release material thereon and the second major surface has a second release material thereon, wherein the first release material comprises a polymer comprising an olefin and an alkyl (meth)acrylate,
wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 28 to about 50 weight % based on the total weight of the release material and the alkyl (meth) acrylate has an alkyl group with a carbon number from 1 to 30.

22. An adhesive article comprising a substrate having an adhesive composition thereon, wherein the adhesive composition has a release material thereon, wherein the release material comprises a polymer comprising an olefin and an alkyl (meth)acrylate, wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 28 to about 50 weight % based on the total weight of the release material and the alkyl (meth) acrylate has an alkyl group with a carbon number from 1 to 30.

23. An adhesive article comprising a substrate having an adhesive composition on one major surface and a release material on an opposing major surface, wherein the release material comprises a polymer comprising an olefin and an alkyl (meth)acrylate, wherein the polymer has (a) an alkyl (meth)acrylate content of about 20 to about 50 weight % based on a total weight of the release material and the alkyl (meth)acrylate has an alkyl group with a carbon number from 2 to 30 or (b) an alkyl (meth)acrylate content of about 28 to about 50 weight % based on the total weight of the release material and the alkyl (meth) acrylate has an alkyl group with a carbon number from 1 to 30.

* * * * *

UNITED STATES PATENT AND TRADEMARK OFFICE
CERTIFICATE OF CORRECTION

PATENT NO. : 6,361,844 B1
DATED : March 26, 2002
INVENTOR(S) : Ou-Yang, David T.

It is certified that error appears in the above-identified patent and that said Letters Patent is hereby corrected as shown below:

<u>Title page,</u>
Item [76], Inventor, "P.O. Box 33427, St. Paul, MN (US) 55133-3427" should read
-- Woodbury, MN (US) --

<u>Column 8,</u>
Line 52, "wit i" should read -- with --

<u>Column 10,</u>
Line 18, "a" should read -- an --

Signed and Sealed this

Ninth Day of September, 2003

JAMES E. ROGAN
*Director of the United States Patent and Trademark Office*